United States Patent
Heidrich (10) Patent No.: US 6,771,035 B2
(45) Date of Patent: Aug. 3, 2004

(54) METHOD AND DEVICE FOR DETERMINING THE ROTOR POSITION OF AN ELECTRIC MOTOR WITH SEVERAL MOTOR STRINGS

(75) Inventor: Torsten Heidrich, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 10/204,831

(22) PCT Filed: Dec. 13, 2001

(86) PCT No.: PCT/DE01/04690
§ 371 (c)(1), (2), (4) Date: Nov. 25, 2002

(87) PCT Pub. No.: WO02/052714
PCT Pub. Date: Jul. 4, 2002

(65) Prior Publication Data
US 2003/0141833 A1 Jul. 31, 2003

(51) Int. Cl.⁷ .............................................. H02P 5/06
(52) U.S. Cl. .................. 318/254; 318/138; 318/439; 318/805; 318/150
(58) Field of Search ............................. 318/254, 138, 318/439, 805, 150

(56) References Cited
U.S. PATENT DOCUMENTS

| | | | |
|---|---|---|---|
| 4,495,450 A | * 1/1985 | Tokizaki et al. | 318/138 |
| 4,712,050 A | * 12/1987 | Nagasawa et al. | 318/254 |
| 5,202,614 A | 4/1993 | Harth et al. | 318/805 |
| 5,202,616 A | 4/1993 | Peters et al. | 318/254 |
| 5,739,652 A | * 4/1998 | Sriram | 318/439 |
| 5,859,520 A | * 1/1999 | Bourgeois et al. | 318/805 |
| 6,034,493 A | * 3/2000 | Boyd et al. | 318/254 |

FOREIGN PATENT DOCUMENTS

EP     0 363 073 A     4/1990

* cited by examiner

*Primary Examiner*—Rita Leykin
(74) *Attorney, Agent, or Firm*—Kenyon & Kenyon (57) ABSTRACT

The specification describes a method and a detection module for determining the rotor position of an electromotor having a plurality of motor phase windings, in which, for determining the rotor position, the polarity of at least one motor phase voltages, which is induced in at least one first motor phase winding, is determined as at least one first polarity value, through comparison to a reference value. The reference value is, for example, a real or simulated star-point voltage. In one embodiment of the invention, the determination of the at least one first polarity value is synchronized to switch-on time point for supplying current to the at least one first or second motor phase winding, and in one specific embodiment, at least one first polarity value is determined after a preestablished delay, which follows the switch-on time point.

18 Claims, 5 Drawing Sheets

METHOD AND DEVICE FOR DETERMINING THE ROTOR POSITION OF AN ELECTRIC MOTOR WITH SEVERAL MOTOR STRINGS

FIELD OF INVENTION

The present invention relates to a method for determining the rotor position of an electromotor having a plurality of motor phase windings, for example, a brushless DC motor and to a detection module for this purpose.

BACKGROUND OF THE INVENTION

In many areas of technology, especially in the motor-vehicle area, so-called brushless DC motors have recently been used, which are also known as BLDC motors (BLDC= Brushless Direct Current) having no brushes, which are subject to wear. Instead of a mechanical commutation, in BLDC motors an electronic commutation is provided, which is generally realized through a power electronics. BLDC motors are also called electronically commutated DC motors, or EC motors (EC=electronically commutated).

A BLDC motor is driven by a power-electronic actuator that functions as a commutator, for example, having a 6-pulse bridge converter, which, using pulse modulation, in general, pulse width modulation, produces from a battery or an intermediate-circuit DC-voltage a three-phase AC voltage system that is variable in frequency and voltage amplitude, so that for the BLDC motor current units are made available that are, for example, essentially rectangular. In this context, supplying current to the motor phase windings of the electromotor, i.e., supplying current to its windings, is carried out as a function of the specific rotor position. Usually, two phase windings are supplied with current simultaneously. In this context, the arms of the bridge converter, that are assigned to the phase windings, are active and supply current to a first phase winding in a positive charge and to a second motor phase winding in a negative charge. In this context, the switches of a third bridge converter arm are opened, and therefore the third arm is inactive.

As a result of the rotor of the electromotor, which has, e.g., a permanent magnet arrangement, a countervoltage is induced in the motor windings, i.e., in the specific motor phase windings. For a high degree of motor efficiency, the motor phase windings should be supplied with current such that the highest possible phase countervoltage, having the same polarity as the specific phase current, is induced in them.

In any case, in a BLDC motor, its instantaneous rotor positions must be known for determining the optimal commutation times. The rotor positions, i.e., the commutation times, can be determined, e.g., by a sensor arrangement or also without the use of sensors, for example, by evaluating the zero crossing points of the induced countervoltages in the phase windings that are not supplied with current. From the zero crossing points, it is possible to determine the rotor angle for the next commutation by extrapolation. However, this method is only suitable for electromotors that are run in continuous operation, e.g., in pumps or ventilators.

In motors having an automatic speed control that includes motor standstill, for example, in motors for positioning drives, more dynamic methods are required for determining the rotor position. In this context, certain difficulties undoubtedly arise:

Through the pulse width modulation (PWM) of the switches in the two active arms of the bridge converter, the current flowing in the active, current-supplied motor phase windings is adjusted and limited. Nevertheless, as a result of the pulse width modulation, interference pulses are generated, which are transmitted to the inactive phase winding, that is not supplied with current, inter alia, due to coupling inductances between the individual motor phase windings, so that the zero crossing point of the induced voltage cannot be measured in the inactive phase winding reliably and without distortion. The clock distortions for evaluation must be filtered out of the respective measuring signal.

However, in this context, in analog filters, phase shifts, among other things, occur, which generate the interfering measuring errors.

A digital filtering method is proposed in U.S. Pat. No. 5,859,520. In this method, a zero crossing point of the induced voltages is measured by clocking an upper switch of a bridge arm, so that a freewheeling current is generated via the lower switch of the same bridge arm. In freewheeling operation, the countervoltage that is induced in the motor phase winding that is assigned to the bridge arm in question is measured with respect to a ground potential of a measuring circuit. In this context, it is disadvantageous, on the one hand, that only the upper switches of the bridge arm can be clocked and, on the other hand, that by clocking the upper switches, so to speak, a forced freewheeling operation is generated in order to be able to carry out the measurements at all. However, from the forced freewheeling operation, the result is a reduced potential utilization of the motor.

SUMMARY OF THE INVENTION

To determine the rotor position, the polarity of the motor phase voltages induced in the motor phase windings is ascertained. For this purpose, the specific motor phase voltages are compared to reference values, specifically to a real or simulated, virtual star-point voltage, that is applied at a star point, and in each case polarity values are calculated. To avoid distortions that falsify the polarity values, a synchronization to the starting times for supplying current to the motor phase windings is carried out, and a predetermined delay is imposed, in which the polarity values achieve a steady-state, stable condition. Then, the polarity values are ascertained, and, for example, the polarity values are supplied to a control unit for controlling the electromotor.

The method according to one embodiment of the present invention is carried out together with a freewheeling method or methods. The necessary evaluation circuit may be compact and intergrated, for example, in a circuit for controlling the electromotor and/or for controlling the power electronics that supplies power to the electromotor. The method according to an embodiment of the present invention is applied over a large speed range in a variable manner, and no measuring errors arise, such as are caused by phase shifts, in the case of methods using analog filters.

In one embodiment of the invention, the polarity values are ascertained and read out only if no freewheeling of the electromotor has occurred during the delay, avoiding interference in the polarity values.

After the preestablished delay has elapsed, a sampling period commences, in which for every motor phase winding not only a single polarity value, but also, in accordance with the length of the sampling period, a plurality of polarity values are determined. The polarity values are each stored in a storage unit. For example, a polarity value that was calculated later may replace a polarity value that was calculated earlier. In one embodiment, only the most recent polarity value of a motor phase winding is stored, and the most recently determined polarity value is then read out.

The sampling period can be terminated as a result of a plurality of events, e.g., as a result of a freewheeling of the electromotor or as a result of a subsequent switch-on time point for supplying current to the electromotor.

As was mentioned above, in conventional methods, the electromotor is supplied with current using pulse width modulation for setting and limiting the currents flowing in the individual motor phase windings. The switch-on times for supplying current to the motor phase windings of the electromotor, in this context, are preferably defined by a pulse-width-modulation basic timing signal. This pulse-width-modulation basic timing signal may be used for synchronization in determining the polarity values.

It is also possible that the pulse-width-modulation basic timing signal is started anew, in each case, by a synchronization signal in response to a commutation of supplying the electromotor with current. In a commutation, the current supply generally alternates from one pair of phase windings to an adjacent pair of phase windings. In one alternative embodiment of the present invention, the determination of the polarity values is synchronized anew, in each case, on the basis of the synchronization signal. Preferably, both the synchronization signal as well as the pulse-width-modulation basic timing signal help in synchronizing the measuring of the polarity values. For example, by combining the basic timing signal and the synchronization signal in a logical "OR," the timing of the measurement of the polarity values may be realized.

The motor phase voltages and the star-point voltage, may be measured at the respective motor phase windings, or at the star point of the motor phase windings in alternative embodiments. However, these actual measuring points are often inaccessible. Therefore, the motor phase voltages and/or the star point voltages are simulated in one preferred embodiment of the invention.

BRIEF DESCRIPTION OF THE FIGURES

For the purpose of illustrating the invention, representative embodiments are shown in the accompanying figures, it being understood that the invention is not intended to be limited to the precise arrangements and instrumentalities shown.

DETAILED DESCRIPTION OF THE PREFERRED EMBODIMENTS

The present invention will now be described in detail for specific preferred embodiments of the invention. These embodiments are intended only as illustrative examples and the invention is not to be limited thereto.

Figure 1A:
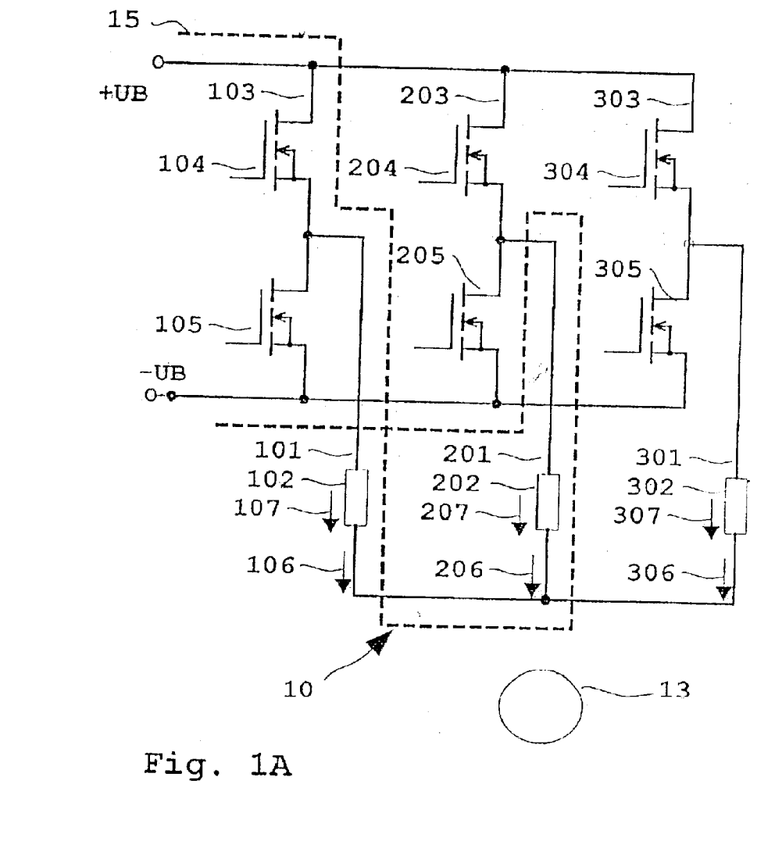
FIG. 1A schematically depicts a bridge converter of one embodiment of the invention, having an electromotor with connected phase windings with a current shown by the hash marks, wherein electrical contact between wire traces only occurs at intersections shown with black dots.
Figure 1B:
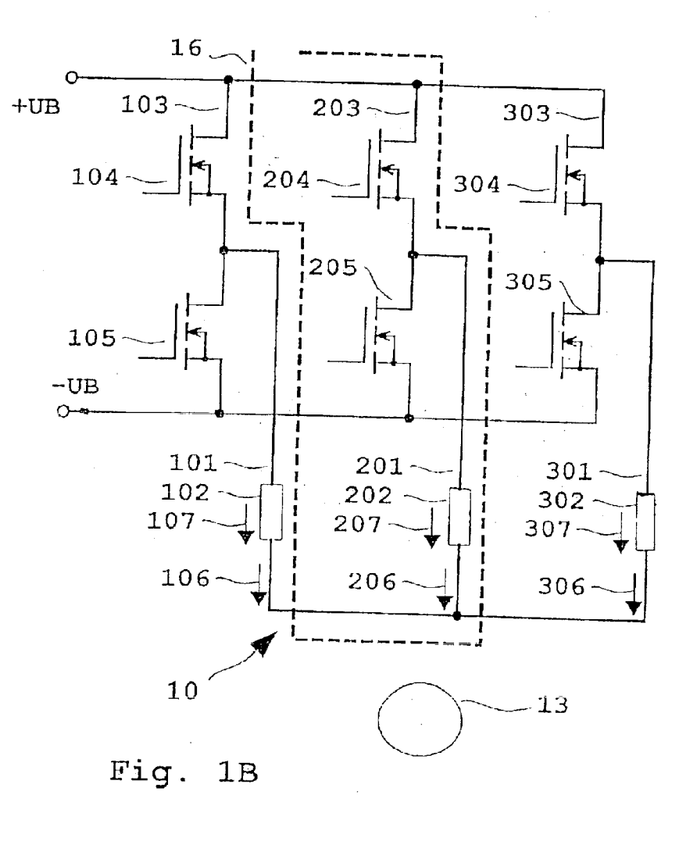
FIG. 1B schematically depicts the same arrangement as FIG. 1A; however the hash marks show the current characteristic of an electromotor during freewheeling (without any applied voltage).

In one embodiment, an electromotor 10 is connected to a six-pulse bridge converter 11 as a power-electronic power-supply unit of the electromotor. Electromotor 10 is a brushless, so-called electronically commutated DC electromotor (BLDC motor) of the type described above. Only motor phase windings 101, 201, 301 having motor windings 102, 202, 302, are depicted, which in FIG. 3 and motor phase windings are disposed in the stator of the electromotor 10 and which are interconnected in a star point 12. Running in the undepicted stator is a rotor 13 that is excited electrically, or by a current magnet, and that for reasons of simplicity is not depicted. The rotor, in response to its rotation induces voltages in motor phase windings 101, 201, 301.

Figure 3:
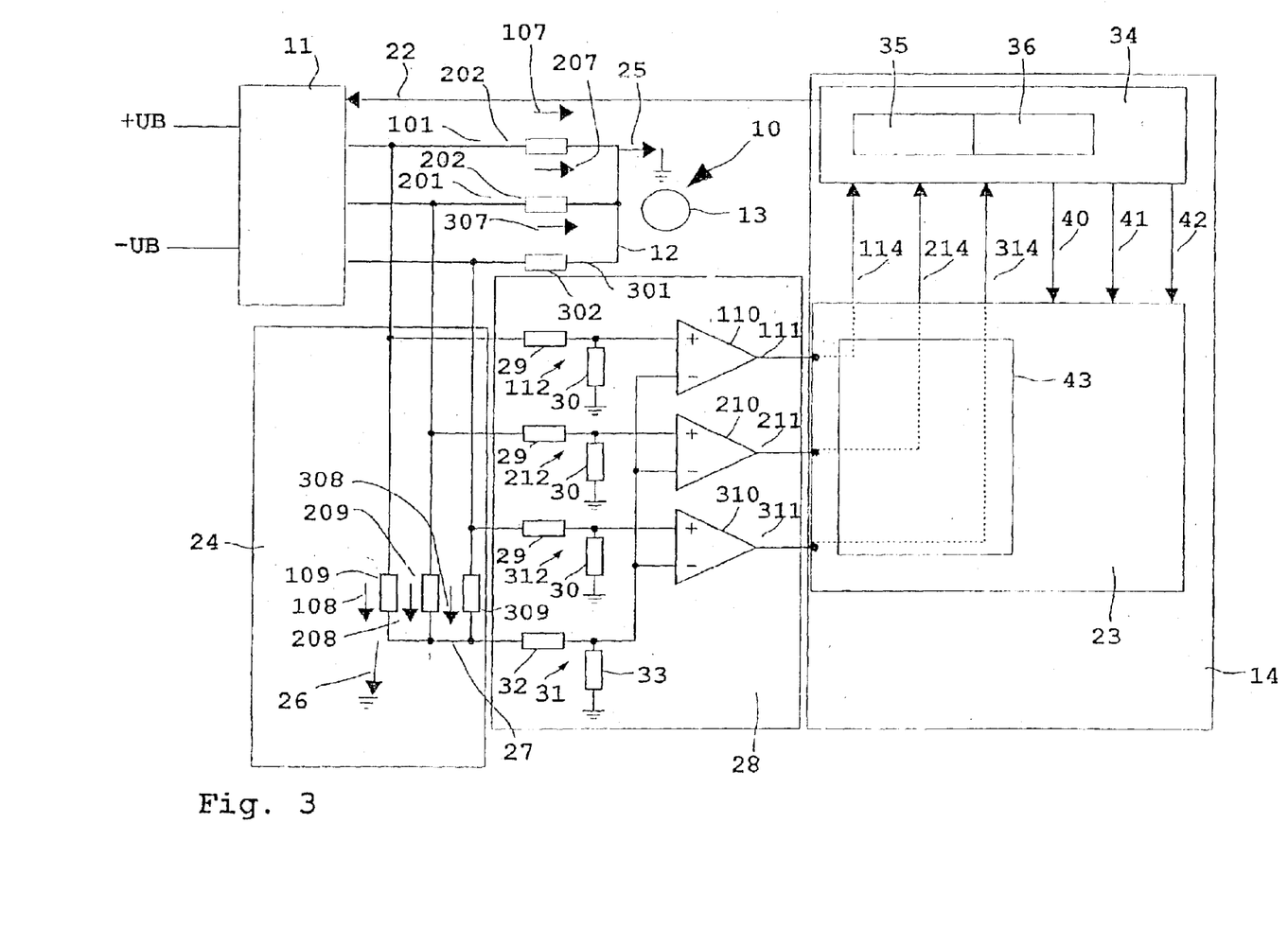
FIG. 3 schematically depicts one embodiment of the invention having a motor control unit with a detection module and a bridge converter, for example of the type shown in FIG. 1A.

A motor control unit 14, via a control line 22, controls bridge converter 11 and therefore electromotor 10. Bridge converter 11 has three bridge arms 103, 203, 303, each bridge arm has an upper switchable value 104, 204, 304 and a lower switchable valve 105, 205, 305. Value 104 105; 204, 205; 304, 305 are switched on and off by motor control unit 14, for example, using pulse width modulation (PWM).

On the input side, bridge converter 11 is connected to a battery or to a DC voltage intermediate circuit having a positive voltage potential $+U_B$ and a negative voltage potential $-U_B$. On the output side, phase windings 101, 201, 301 are each connected to bridge arms 103, 203, 303 between valves 104, 105; 204, 205; 304, 305. Valves 104, 105; 204, 205; 304, 305 are, for example, power transistors, through which current flow can be switched on and off in the direction from positive voltage potential $+U_B$ to negative voltage potential $-U_B$ or, from the pick-off of phase windings 101, 201, 301 to bridge arms 103, 203, 303, in the direction of negative voltage potential $-U_B$. In the opposite direction, valves 104, 105; 204, 205; 304, 305, as protection here against induced overvoltages, each have an internal diode, indicated by an arrow. It is also possible that an external diode is connected to valves 104, 105; 204, 205; 304, 305. In any case, the diodes permit a freewheeling of the electromotor 10, e.g., the freewheeling state depicted in FIG. 1B.

Figures 2A, 2B:
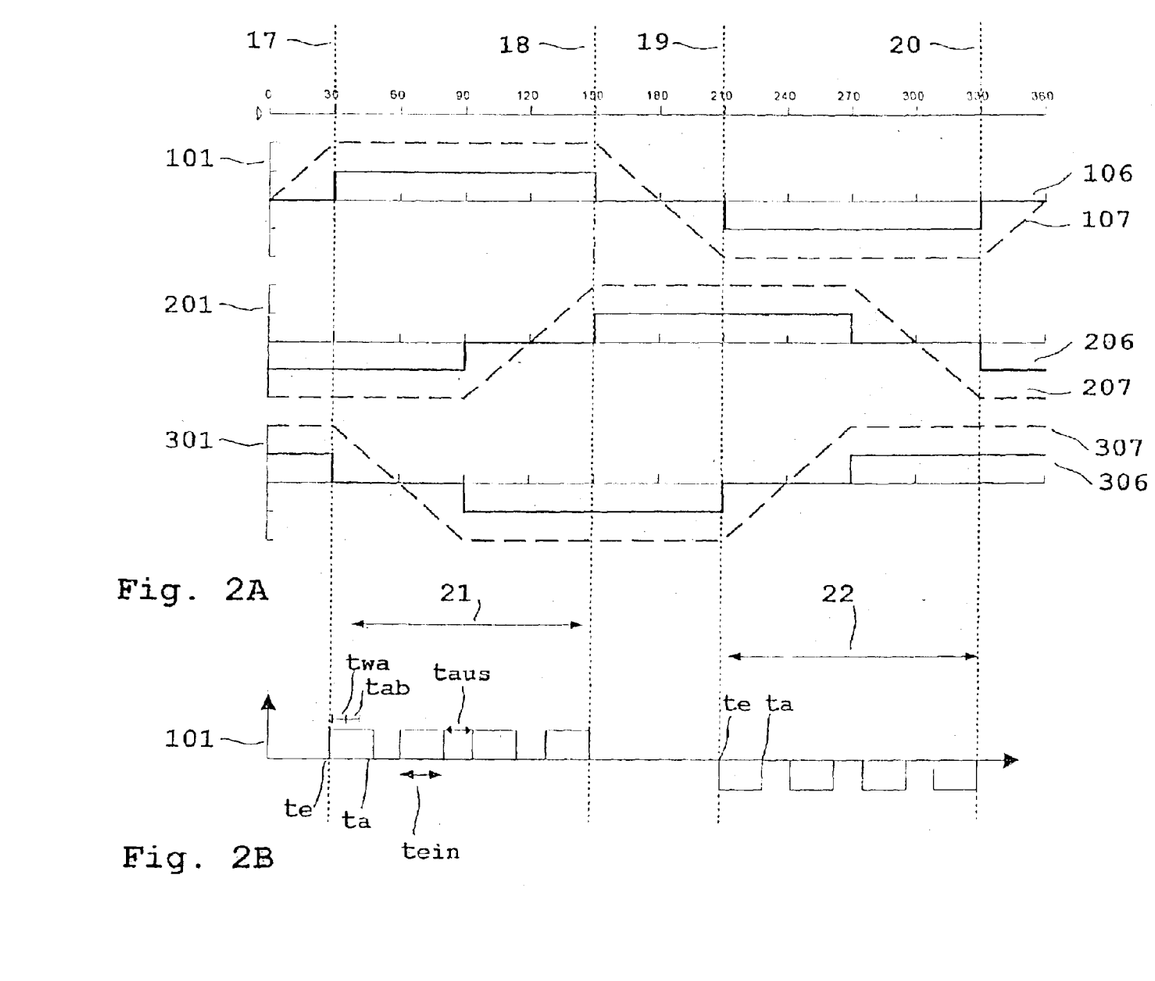
FIG. 2A shows exemplary currents and voltages induced in the motor phase winding of the bridge converter depicted by FIG. 1A and 1B.
FIG. 2B shows a pulse modulated current supply of one phase winding shown in FIG. 2A.

Phase currents 106, 206, 306, flowing, in each case, across motor phase windings 101, 201, 301 are adjusted by motor control unit 14 by switching valves 104, 105; 204, 205; 304, 305 on and off. Typically, as depicted in the exemplary embodiment, in each case, two phase windings 101, 201, 301 are supplied with current simultaneously. In this context, one motor phase winding 101, 201, 301 is supplied with current in a positive charge and the second phase winding in a negative charge. An idealized commutation pattern for an electrical rotation of rotor 13 is shown in FIG. 2A, in which the phase currents 106, 206, 306 flow through motor phase windings 101, 201, 301 and motor phase voltages 107, 207, 307 induced in motor phase windings 101, 201, 301 by rotor 13, which is excited electrically or by a permanent magnet, and the phase currents are depicted by dotted lines in FIG. 2A.

It is apparent that between commutation time points 17, 18, which lie between the electrical angles 30° and 150° in the rotational direction of electromotor 10, phase winding 101 is supplied with current in a positive charge and motor phase winding 201 in a negative charge, and between commutation time points 19, 20 lying between electrical angles 210° and 330°, phase winding 201 is supplied with current in a positive charge and motor phase winding 101 in a negative charge. For example, valves 104, 205, for adjusting a current-supply state, are switched on between commutation time points 17, 18, as depicted in FIG. 1A. In addition, a current 15 is shown that flows from positive voltage potential $+U_B$ via valve 104, motor windings 102, 202, and valve 205, to negative voltage potential $-U_B$.

For a high motor efficiency of electromotor 10, a phase winding 101, 201, 301 is always supplied with current at the highest possible induced motor phase voltage 107, 207, 307 of the same polarity. In the circuit diagram depicted in FIG. 2A, motor phase windings 101, 201, 301 are each supplied with current between the specific commutation time points either continuously or, alternatively not continuously. Electromotor 10, in this context, is under a full load.

The electromotor 10 moves briefly into a freewheeling operation, as a result of the pulsed switching of valves 104, 105; 204, 205; 304, 305, in one embodiment, using pulse windings width modulation. The phase currents 106, 206, 306, flow in individual motor phase windings 101, 201, 301, are limited. A freewheeling state of this type is schematically shown in FIG. 1B. In this context, valve 205 is closed, so that a freewheeling current 16 flows through valve 104, motor windings 102, 202, and the internal diode of valve 204.

An alternating switching of valve 205, for alternating between a current-supplied and a freewheeling state for motor phase windings 101, 201, is depicted in FIG. 2B as one alternative embodiment of the invention. Phase winding 301, in this context, is connected without current and is electrically separated from voltage potentials $+U_B$, $-U_B$. Valve 205 is switched on (current-supplied state), in each case, at switch-on points, $t_e$ for a switch-on time $t_{ein}$, and is switched off (freewheeling state) at switch-on time points $t_a$ for a switch-off time $t_{aus}$. In this context, motor control unit 14 initiates a sequence 21 from current units having positive phase current 106, between commutation time points 17, 18, and a sequence 22, of current units having a negative phase current 106, between commutation time points 19, 20.

It is evident that motor control unit 14 can also bring about other commutation patterns of phase currents 106, 206, 306 and/or pulse patterns of phase currents 106, 206, 306 by an appropriate switching of valves 104, 105; 204, 205; 304, 305.

In an alternative embodiment, the motor control unit 14 contains a detection module 23 for determining the rotor position of electromotor 10. Connected upstream of detection module 23 is a simulation module 24, which simulates motor phase voltages 107, 207, 307 as virtual motor phase voltages 108, 208, 308 and which simulates a virtual star point voltage 26 from virtual motor phase voltages 108, 208, 308. Virtual motor phase voltages 108, 208, 308 drop off at resistors 109, 209, 309, which are each connected, on the input side, to bridge arms 103, 203, 303, parallel to motor windings 102, 202, 302, and which, on the output side, are interconnected at a virtual star point 27, at which virtual star-point voltage 26 drops off. In any case, due to simulation module 24, it is not necessary that the actual star point 12 is contacted for detecting the actual star-point voltage 25.

Connected between simulation module 24 and detection module 23 is a comparator module 28 for determining the polarity of motor phase voltages 107, 207, 307. Comparator module 28 compares motor phase voltages 107, 207, 307 to virtual star-point voltage 26, which constitutes a reference value. Comparator module 28 contains operation amplifiers 110, 210, 310, that are connected as comparators, which, on the input side, compare the voltage differences applied at them between motor phase voltages 107, 207, 307, on the one hand, and virtual star-point voltage 26, on the other hand, and which, on the output side, read out the polarity, determined in this context, of the individual voltage different as polarity values 111, 211, 311 in the form of output voltages. Polarity values 111, 211, 311, in a polarity change of the individual voltage difference, fluctuate from a negative to a positive maximum value, and back again. Operation amplifiers 110, 210, 310 are connected in an undepicted manner to a power-supply voltage.

Motor phase voltages 107, 207, 307 are applied at voltage dividers 112, 212, 312, which are connected upstream of the plus-inputs of operation amplifiers 110, 210, 310, and which in each case have a resistor 29 connected to bridge arms 103, 203, 303 parallel to motor windings 102, 202, 302 and a resistor 30, that is connected to the latter and that is connected to ground. Virtual star-point voltage 26 is applied at a voltage divider 31, which has a resistor 32, which is connected between the virtual star point and the minus-inputs of operation amplifiers 110, 210, 310, and a resistor 33, which is connected between the minus-inputs and ground. In any case, the motor phase voltages 107, 207, 307 as well as virtual star-point voltage 26, as a result of voltage dividers 112, 212, 312; 31, are dimensioned such that they can be processed by operation amplifiers 110, 210, 310. A suitable dimensioning of resistors 29, 30; 32, 33 is known to one of ordinary skill in the art, and the dimensioning is a function, inter alia, of the properties of operation amplifiers 110, 210, 310.

Detection module 23, as a detection means, contains here a logical field that is programmed in accordance with the present invention, using, for example, a (Field) Programmable Logic Array ((F)PLA) or a (Field) Programmable Gate Array ((F)PGA). Alternatively, the detection means can be a discrete logic circuit or a suitable processor, which carries out a program module according to the present invention. The detection means of detection module 23, for determining polarity values 111, 211, 311, can be synchronized to switch-on time points, e.g., switch-on time points $t_e$, for supplying current to motor phase 101, 201, 301, specifically such that the means determine polarity values 111, 211, 311 after a preestablished delay $t_{wa}$ that is subsequent to the specific switch-on time points. A delay $t_{wa}$ of this kind, after current has begun to be supplied to motor phase winding 101, is drawn in, by way of example, in FIG. 2B.

Detection module 23 samples the polarity values 111, 211, 311 for example, on the basis of two variants, and it "filters" out the interferences containing any so-called "raw" polarity values 111, 211, 311. Subsequently, detection module 23, from raw polarity values 111, 211, 311, reads out the calculated, so-called digitally filtered polarity values 114, 214, 314 to a control module 34 of motor control unit 14, which control module controls bridge converter 11.

Then, the control module 34 determines the specific electrical reference angle of rotor 13 on the basis of signal changes in polarity values 114, 214, 314 and, therefore, the assigned commutation time points. However, this function could also alternatively be satisfied by detection module 23. Intermediate values of the reference angles, which cannot be picked off directly from polarity values 114, 214, 314, can be determined by control module 34, or detection module 23, for example, using extrapolation. In another alternative, it is possible that detection module 23 and/or control module 34 only reads out the one polarity value from 114, 214, 314 that is assigned to an instantaneously not current-supplied phase winding 101, 201, 301, e.g., between commutation time points 17, 18, first polarity value 311 of phase winding 301 and then polarity value 211 of phase winding 201.

The control module 34 is depicted only in a schematic fashion and, by way of example, in the form of a control device 35 and storage device 36. The control device 35 is a processor or a group of processors in one embodiment, for example, digital signal processors that can execute the program code from program modules that are stored in the storage device 36. Control module 34, on the one hand, controls bridge converter 11 and, in this context, provides the circuit pattern for valves 104, 105; 204, 205; 304, 305, for setting the current-supplied and freewheeling states. On the other hand, the control module 34 also supplies to detection module 23 as synchronization signals a "Freewheeling-ON" signal 40, a "PWM-pulse-start" signal 41, and a "PWM-pulse" signal 42.

In one embodiment of the invention, "PWM-pulse" signal 42 is the PWM basic timing signal and is read out at switch-on time points $t_e$, for example, as a logical "1." It represents, in each case, the beginning of a current pulse of pulse width $t_{ein}$ on one of motor phase windings 101, 201, 301. For example, see switch-on-time points $t_e$ of the current-supply of the motor phase windings shown in FIG. 2B.

In one embodiment, the PWM basic timing signal is also "PWM-pulse" signal 42, and is in each case started anew in response to a commutation. Thus, at the commutation time points 17, 18, 19, 20, a "PWM-pulse-start" signal 41 is read out as logical "1." Therefore, the motor phase windings 101, 201, 301, are supplied with current immediately after commutation, to the extent that they had previously not been supplied with current, and a current supply for specific motor phase winding 101, 201, 301 is available, for example using a current pulse. The beginning of a current-supply of this kind is determined, for example, by commutation time points 17, 19 for motor phase winding 101 in FIG. 2B.

A "Freewheeling-ON" signal 40 is read out at the beginning of a freewheeling state on one of the motor phase windings 101, 201, 301 at time points $t_a$, for example, as a logical "1."

Figure 4:
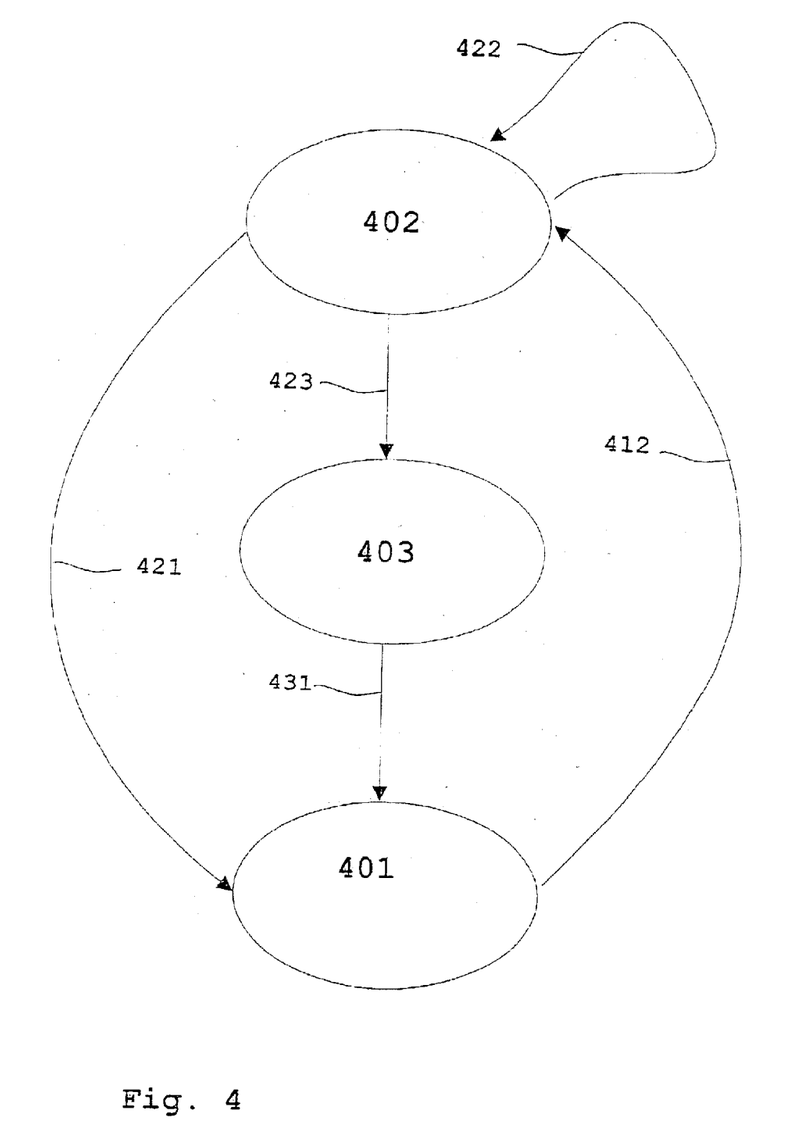
FIG. 4 schematically depicts a state-transition diagram for one alternative embodiment of a method according to the present invention.

An alternative embodiment for determining polarity values 114, 214, 314 is depicted in FIG. 4. The starting state there is a state "Waiting for current supply" 401. If detection module 23, in this state, receives one of signals "PWM-pulse-start" signal 41 or "PWM-pulse" signal 42 having logical "1", for example, a switch-on signal is given by control module 34 for supplying current to motor phase windings 101, 201, 301, then detection module 23 moves into a state "Current-supply switched on" 402, which is indicated by a transition 412. Detection module 23 is therefore synchronized to a switch-on time point for supplying current to at least one of motor phase winding 101, 201, 301.

In state "Current-supply switched on" 402, detection module 23 starts a timer, to wait to the end of a preestablished delay $t_{wa}$ until initiating the sampling of the polarity values 111, 211, 311. Delay $t_{wa}$ is, for example, provided such that operation amplifiers 110, 210, 310 achieve a steady-state condition and read out stable polarity values 111, 211, 311, and the delay can be determined and set according to methods known to one of ordinary skill in the art.

After the elapsing of delay $t_{wa}$, detection module 23 moves into a state "Sampling and reading out the polarity values" (transition 423). In this state, detection module 23 scans polarity values 111, 211, 311, and reads them out to control module 34 as polarity values 114, 214, 314. Subsequently, detection module 23, in a transition 431, moves once again to state "Waiting for current-supply" 401.

If, in state "Current-supply switched on" 402, control module 34 connects bridge converter 11 for initiating a freewheeling operation, and detection module 23 receives "Freewheeling-ON" signal 40, then detection module 23 also moves into state "Waiting for current-supply" 401.

If detection module 23 in state "Current-supply switched on" 402 once again receives a signal "Current-supply switched on", in particular "PWM-pulse-start" signal 41 produced on the basis of a commutation, possibly also "PWM-pulse" signal 42, then detection module 23 starts a timer once again for determining preestablished delay $t_{wa}$, which is depicted by transition 422.

Figure 5:
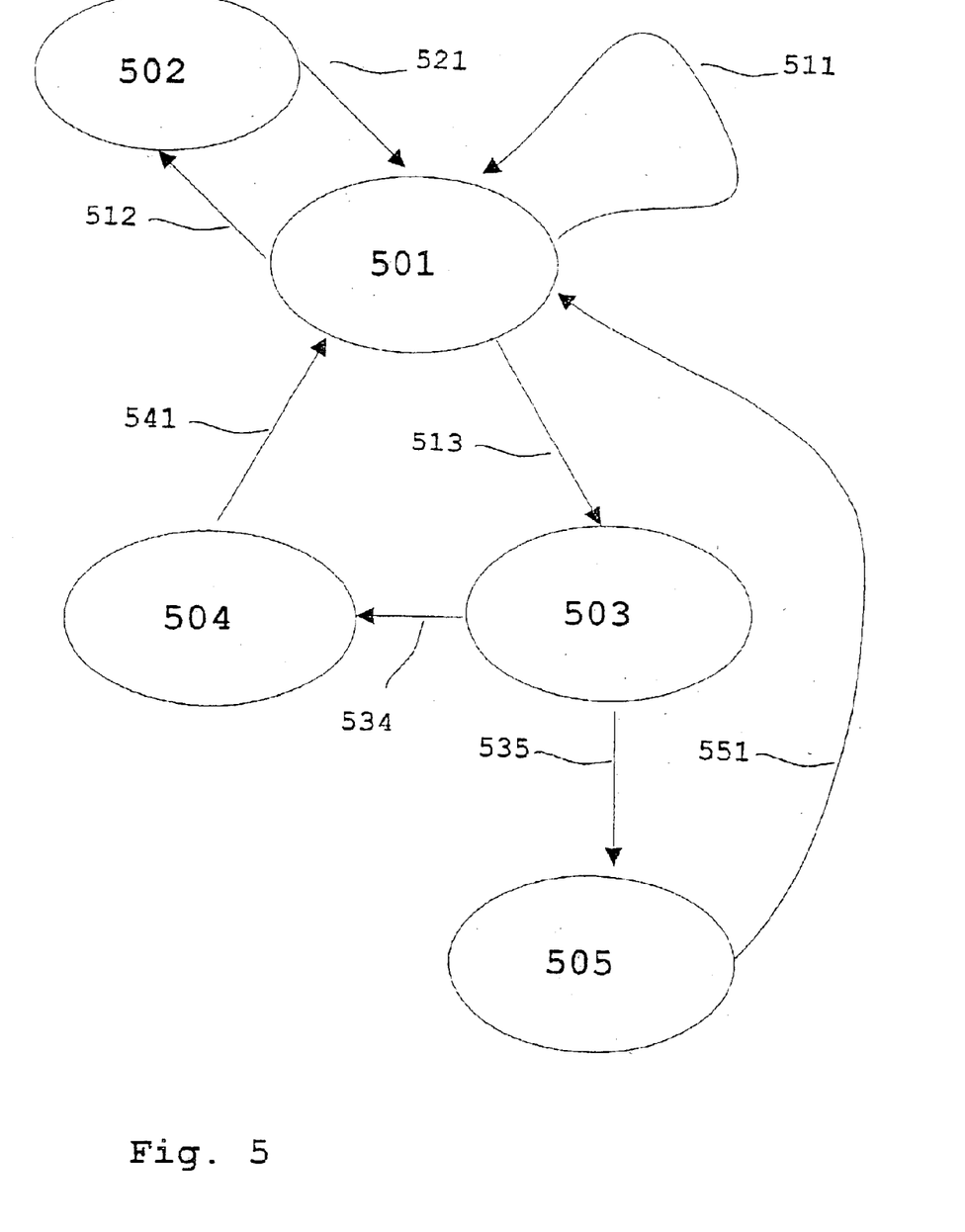
FIG. 5 schematically depicts another alternative embodiment of a method according to the present invention.

An alternative embodiment for determining polarity values 114, 214, 314 is depicted in FIG. 5. The point of departure is a state "Current-supply switched on" 501, which is adopted on the basis of one of the signals "PWM-pulse-start" signal 41 or "PWM-pulse" signal 42. In state 501, detection module 23 starts a timer, to wait to the end of a preestablished delay $t_{wa}$ until the sampling of polarity values 111, 211, 311.

If detection module 23 in state "Current-supply switched on" 501 once again receives a signal "Current-supply switched on" ("PWM-pulse-start" signal 41 or "PWM-pulse" signal 42), then it starts a timer once again for determining preestablished delay $t_{wa}$, as is depicted by a transition 511.

If detection module 23, in state "Current-supply switched on" 501, receives the "Freewheeling-ON" signal 40, then detection module 23 moves into state "Freewheeling before end of delay" 502 (transition 512), in which no sampling of polarity values 111, 211, 311 takes place. If detection module 23, in state "Free running before termination of delay" 502, receives a signal "Current supply switched on" ("PWM-pulse-start" signal 41 or "PWM-pulse" signal 42), then it once again moves into state "Current supply switched on" 501 (transition 521).

If, in state "Current-supply switched on" 501, delay $t_{wa}$ has elapsed, without one of synchronization signals 40, 41, 42 having been received, then detection module 23 moves into a state "Current-supply active after delay" 503 (transition 513). In this state, detection module 23 scans polarity values 111, 211, 311 once or, during a sampling period $t_{ab}$, repeatedly, e.g., using a preestablished sampling frequency, and stores them in storage unit 43 that is configured, e.g., as a shift register.

If, during state "Current supply active after delay" 503, "Freewheeling-ON" signal 40 is received, and electromotor 10 therefore moves into freewheeling operation, then detection module 23, in a transition 534, moves into a state "Read out in freewheeling" 504 and reads out the most recently scanned polarity values 111, 211, 311 as polarity values 114, 214, 314. In response to a signal "Current-supply switched on" ("PWM-pulse-start" signal 41 or "PWM-pulse" signal 42), detection module 23 once again moves into state "Current-supply switched on" 501 (transition 541).

If, during state "Current-supply active after delay" 503, a signal "Current-supply switched on" is received ("PWM-pulse-start" signal 41 or "PWM-pulse" signal 42), detection module 23 moves into a state "Read out without freewheeling" 505 (transition 535), in which it reads out most recently scanned polarity values 111, 211, 311 as polarity values 114, 214, 314. Immediately thereafter, detection module 23, in a transition 551, once again goes into state "Current-supply switched on" 501.

In other alternatives, the detection module 23 can be configured as a software module, which contains a program code that can be executed by a control device, e.g., a processor. For example, processor 35 of motor control unit 14 could execute a software module of this type. The detection module 23, from a functional standpoint, would then be integrated into control module 34.

In yet another embodiment, comparator module 28 compares virtual motor phase voltages 108, 208, 308 to actual star-point voltage 25 or, alternatively compares virtual motor phase voltages 108, 208, 308 to virtual star-point voltage 26.

In yet another embodiment, the simulation module is a component part of the detection module 23 and/or the motor control unit 14.

In another embodiment, the comparator module 28 is integrated in the detection module 23 and/or motor control unit 14. For example, the comparator module 28 and/or the detection module 23 could be realized using an ASIC component (Application Specific Integrated Circuit).

As yet another alternative, the "PWM-pulse" signal 42 is used for synchronizing detection module 23 to the specific switch-on time points for supplying current to the motor winding phases 101, 201, 301.

What is claimed is:

1. A method for determining a rotor position of an electromotor having a plurality of motor phase windings, comprising:
   determining a polarity of at least one phase voltage induced in at least one first motor phase winding as at least one first polarity value by performing a comparison to a reference value that is applied to a star point of the at least one first motor phase winding;
   synchronizing the determining of the at least one first polarity value to at least one switch-on time point for supplying current to one of the at least one first motor phase winding and at least one second motor phase winding; and
   determining the at least one first polarity value after a preestablished delay that follows the at least one switch-on-time point.

2. The method as recited in claim 1, wherein:
   the electromotor includes a brushless DC motor.

3. The method as recited in claim 1, wherein:
   the reference value includes one of a real star-point voltage and a simulated star-point voltage.

4. The method as recited in claim 1, further comprising at least one of:
   only determining the at least one first polarity value if no freewheeling of the electromotor has occurred during the preestablished delay; and
   only outputting the at least one first polarity value if no freewheeling of the electromotor has occurred during the preestablished delay.

5. The method as recited in claim 1, further comprising:
   after an elapsing of the preestablished delay, beginning a sampling period in which at least one second polarity value can be determined.

6. The method as recited in claim 5, further comprising:
   outputting a most recently determined one of the at least one first polarity value and the at least one second polarity value after an elapsing of the sampling period.

7. The method as recited in claim 5, further comprising:
   terminating the sampling period by one of freewheeling of the electromotor and a subsequent switch-on-time point for supplying current to the electromotor.

8. The method as recited in claim 1, further comprising:
   supplying the electromotor with current in accordance with a pulse width modulation, the at least one switch-on time point being defined by a pulse-width-modulation basic timing signal; and
   synchronizing the determining of the at least one first polarity value on the basis of the pulse-width-modulation basic timing signal.

9. The method as recited in claim 8, further comprising:
   in response to a commutation, restarting the pulse-width-modulation basic timing signal in accordance with a synchronization signal; and
   synchronizing the determining of the at least one first polarity value in accordance with at least one of the pulse-width-modulation basic timing signal and the synchronization signal.

10. The method as recited in claim 3, further comprising:
    simulating the one of the real star-point voltage and the simulated star-point voltage.

11. The method as recited in claim 5, further comprising:
    determining if the at least one first motor phase winding is not supplied with current; and
    reading one of the at least one first polarity value and the at least one second polarity value if the at least one first motor phase winding is not supplied with current.

12. A detection module for determining a rotor position of an electromotor having a plurality of motor phase windings, comprising:
    a detection arrangement for determining a polarity of at least one phase voltage induced in at least one first motor phase winding as at least one first polarity value by performing a comparison to a reference value that is applied to a star point of the at least one first motor phase winding; and
    an arrangement for synchronizing the detection arrangement to at least one switch-on time point for supplying current to one of the at least one first motor phase winding and at least one second motor phase winding, wherein:
       the detection arrangement determines the at least one first polarity value after a preestablished delay that follows the at least one switch-on-time point.

13. The detection module as recited in claim 12, wherein:
    the electromotor includes a brushless DC motor.

14. The detection module as recited in claim 12, wherein:
    the reference value includes one of a real star-point voltage and a simulated star-point voltage.

15. The detection module as recited in claim 12, further comprising:
    a control arrangement; and
    a memory for storing a program code that can be executed by the control arrangement.

16. The detection module as recited in claim 15, wherein:
    the control arrangement includes a processor of a motor control unit for controlling the electromotor.

17. The detection module as recited in claim 12, wherein:
    the detection module is arranged in a motor control unit.

18. The detection module as recited in claim 25, wherein:
    the detection module is stored in a storage device including one of a diskette, a CD-ROM, a Digital Versatile Disk, and a hard disk drive.

* * * * *